Oct. 21, 1969    F. M. BARTLETT    3,473,787
METHOD AND APPARATUS FOR MIXING DRILLING FLUID
Filed Dec. 18, 1967
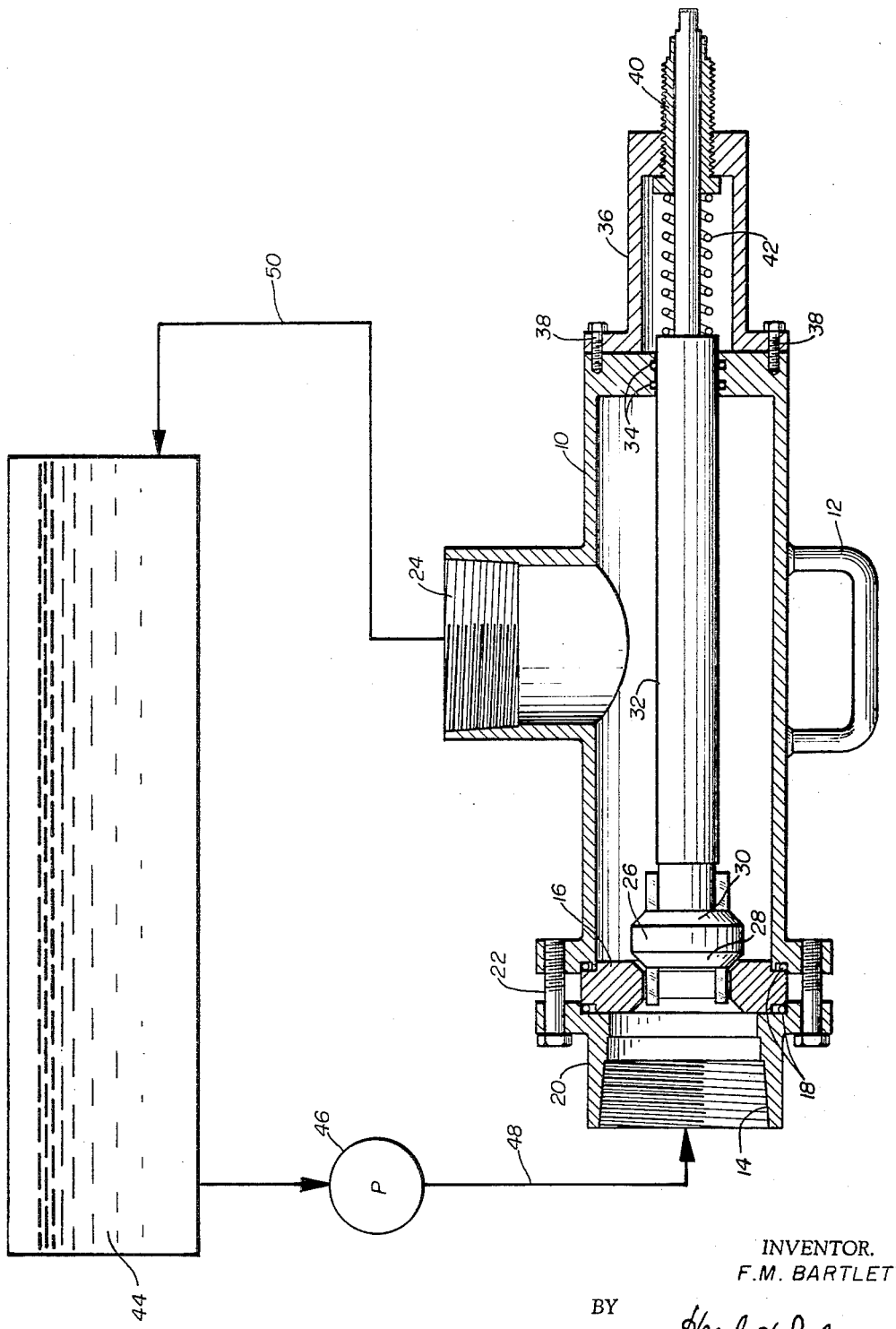
INVENTOR.
F.M. BARTLETT
BY
*Head & Johnson*
ATTORNEYS United States Patent Office 3,473,787
Patented Oct. 21, 1969

3,473,787
METHOD AND APPARATUS FOR MIXING
DRILLING FLUID
Floyd M. Bartlett, 6032 E. 57th St.,
Tulsa, Okla. 74135
Filed Dec. 18, 1967, Ser. No. 691,520
Int. Cl. B01f 5/12
U.S. Cl. 259—95                                 3 Claims

ABSTRACT OF THE DISCLOSURE

Oil well drilling fluid additives in slurries are intimately mixed by producing a high rate of shear to subdivide particles of additives within the drilling fluid.

BACKGROUND OF THE INVENTION

This invention relates to the well drilling art. More particularly, the invention relates to the drilling fluids utilized in combination with apparatus for drilling oil wells. Typically, the function of a drilling fluid is to cool and lubricate and bit and drill string in addition to removing and transporting drilled cutting, controlling, subsurface formation pressures and line the wall of the well with a filter cake. To achieve these characteristics colloidal solid and/or emulsified liquids are utilized to make a continuous phase base to furnish desired viscosity, thixotropy, and/or weighting. In addition, other chemicals are utilized, depending upon the drilling characteristics desired or encountered, to control the various properties of a drilling fluid.

Clay, e.g. sodium bentonite, is typically used to form the gel phase of a drilling fluid. However, to increase the yield of clay to permit the maximum water saturation, the clay particles must be minutely broken. Various devices such as hydraulic jet mixing apparatus, propeller or other mechanical type mixers and the like have been utilized to break up the clay particles to increase its yield. In some instances the final and ultimate yield of the clay is achieved during the actual drilling process and as the clay particles are circulated or pass the rotating drill bit. These processes and apparatus, however, have been found to be very slow and inefficient. This results in a great deal of waste of bentonitic materials or other additives.

SUMMARY

This invention provides a method of mixing or pre-mixing drilling fluid of the clay-water type, emulsion slurries, or other types of drilling fluids requiring dispersed particles therein. A high rate of shear, variable as a function of pressure, is utilized to break the particles down to cause their mixture or immediate hydration thereof. Fluid and the particles under pressure are forced against a variable pressure valve which is opening relative to a fixed valve seat. Fluids jetting between the valve and the valve seat create high rates of shear to break the particles down and disperse same into the drilling fluid. The drilling fluid is thence returned to a central supply storage or to the drill string for use.

The drawing, submitted herewith, is a combined sectional and schematic view of the apparatus and process of this invention.

DESCRIPTION OF THE PREFERRED EMBODIMENT

The apparatus of this invention comprises a housing 10 having a handle 12 for carrying the device to a desired and accessible location. An inlet 14 includes suitable types of pipe or conduit connection fittings such as threads shown. A valve seat 16 is sealed, using O-rings 18 between the inlet connector 20 and housing 10 using flange bolts 22. Outlet connection 24 is typically provided as a part of housing 10. Interiorly and reciprocably operated within the housing is valve 26, which, in this embodiment, includes forward and rearward tapered facings 28 and 30, respectively. The valve seat is a reversible element threadably attached to actuating shaft 32. The shaft extends longitudinally through housing 10 being sealed thereto by O-rings 34. Valve seat 16 is reversible in the event of erosion or corrosion or pitting of the valve seat facing. Surrounding the valve actuating rod 32 at the outer end therof is retainer 36 which is threadably fastened to housing 10 by bolts 38. A sleeve member 40 is threadably attached to retainer 36 and operable to adjust the tension of spring 42 which operates against the valve actuating shaft 32 to provide the amount of pressure necessary to open the valve 26 away from its seat 16. The amount of the opening is a function of the viscosity of the drilling fluid. That is, as the viscosity increases the opening between the valve and the valve seat must be increased.

Typically the apparatus of this invention is used as a mud pre-mixing process prior to its circulation in the mud system in the well. That is, when it is desirable to present the maximum yield of clay particles as quickly as possible, the apparatus and system of this invention is utilized before the actual drilling process. As such, suitable connection is made from the drilling fluid supply 44 to an auxiliary or the existing mud pump 46 utilized in the drilling process, the outlet 48 from which is directed to the inlet connector 20. Further, outlet connection 50 is made from the housing 10 and connection 24 returning back to the drilling fluid storage 44.

The invention has been described with reference to a specific and preferred embodiment. It will be apparent, however, that other modifications can be made without departing from the spirit and scope of the invention. For example, the apparatus has been found to be useful in pre-mixing emulsion slurries, such as oil and water to form very tight emulsions. Accordingly, this invention should be construed not to be limited to the embodiments herein described but should be limited only by the scope of the appended claims.

What is claimed:
1. A system for hydrating bentonite clay particles into well drilling fluid comprising,
  a storage tank for said particles and fluid;
  closed conduit means to hydrate said particles into said fluid comprising:
    a housing having an inlet conduit from said tank and outlet conduit back to said tank,
    a valve seat restricting the passage between said inlet and outlet,
    a valve,
    means normally biasing said valve into said seat against the flow of fluid from said inlet, and
a pump, in said inlet conduit, to maintain particle and fluid pressure slightly greater than said bias pressure on said valve to maintain a space between said valve and valve seat sufficient to cause said particles and fluid to undergo a high rate of shear to hydrate said particles.

2. A system according to claim 1 wherein said means to bias includes a spring and means to adjust the pressure of said spring against said valve.

3. A system according to claim 1 applicable to forming stable emulsions such as oil and water instead of hydating bentonite clay particles into well drilling fluids.

References Cited

UNITED STATES PATENTS

| | | | |
|---|---|---|---|
| 2,692,798 | 10/1954 | Hicks | 259—95 X |
| 3,166,020 | 1/1965 | Cook | 259—95 X |
| 3,233,874 | 2/1966 | Betulius | 259—95 |

ROBERT W. JENKINS, Primary Examiner